United States Patent [19]
Worringer

[11] Patent Number: 6,161,445
[45] Date of Patent: Dec. 19, 2000

[54] GUIDE SPROCKET ASSEMBLY

[75] Inventor: Thomas J. Worringer, Milwaukee, Wis.

[73] Assignee: Svedala Industries, Inc., Waukesha, Wis.

[21] Appl. No.: 09/280,502

[22] Filed: Mar. 30, 1999

[51] Int. Cl.[7] ..................................................... F16D 27/02
[52] U.S. Cl. ........................ 74/89.21; 74/89.22; 474/88; 474/95; 474/150; 474/156; 474/164
[58] Field of Search ..................................... 474/155, 156, 474/157, 165, 148, 150, 84, 88, 95, 164; 74/89.2, 89.21, 89.22

[56] References Cited

U.S. PATENT DOCUMENTS

| | | | |
|---|---|---|---|
| 4,227,422 | 10/1980 | Kawashima et al. | 474/156 |
| 5,012,263 | 4/1991 | Tull et al. | 474/164 X |
| 5,848,948 | 12/1998 | Allen | 474/156 |
| 5,899,825 | 5/1999 | Hamphoff et al. | 474/150 |

*Primary Examiner*—Charles A Marmor
*Assistant Examiner*—Saúl Rodríguez
*Attorney, Agent, or Firm*—Andrus, Sceales, Starke & Sawall, LLP

[57] ABSTRACT

A guide sprocket assembly for use in combination with a non-driven, rotating tail shaft. The guide sprocket assembly includes a lock plate assembly securely fixed to the tail shaft for rotation along with the tail shaft. The lock plate assembly includes an annular sprocket groove that receives an annular guide sprocket having a plurality of projecting teeth spaced along its outer circumference. The guide sprocket is retained within the annular sprocket groove by a sprocket retainer. The combination of the guide sprocket and sprocket retainer are freely rotatable within the annular sprocket groove relative to the lock plate assembly. The teeth of the guide sprocket engage a drive chain, and the guide sprocket can rotate either in the direction of rotation of the tail shaft or in an opposite direction to properly align the individual links of the drive chain with the teeth formed on the guide sprocket.

19 Claims, 4 Drawing Sheets

GUIDE SPROCKET ASSEMBLY

BACKGROUND OF THE INVENTION

The present invention relates to a system for the conversion of iron-ore into iron-ore pellets or directly into highly metalized sponge iron. More specifically, the present invention relates to an improved tail shaft assembly for use in a traveling grate of the above system.

Generally, known direct reduction systems consist of a traveling grate, a ported or non-ported rotary kiln, and a rotary cooler connected in series. Pelletized iron-ore concentrate is fed to the oxidizing traveling grate for drying and preheating in order to provide strength to the iron-ore pellets. The hot, preheated pellets are then fed directly into the rotary kiln. Solid fuel, such as coal or other processing agents, can be added to the traveling grate and discharged along with the iron-ore pellets into the rotary kiln. In the case of a ported kiln, natural gas, oil or other fluid fuels can be introduced to the ports. Pellets discharging from the lower end of the kiln are then cooled in the rotary cooler and output for further downstream processing.

In the above-described and known system, the traveling grate used in drying and preheating the pellets generally includes a series of spaced lateral slats mounted between a plurality of individual drive chains. Each of the drive chains is entrained between a downstream drive shaft and an upstream tail shaft. The drive shaft is powered to cause the traveling grate to rotate between the drive shaft and the tail shaft.

Preferably, the tail shaft includes a plurality of spaced rollers that each support one of the drive chains as the drive chain is pulled around the tail shaft. Each of these individual rollers is generally smooth and is secured to the tail shaft to rotate with the tail shaft and guide the drive chains and attached slats. In addition to the plurality of rollers, the tail shaft typically includes a guide sprocket that is secured to the tail shaft. The guide sprocket includes a plurality of individual teeth spaced along its outer circumference. The spacing or pitch between the teeth on the guide sprocket is selected such that each tooth receives a link of the drive chain as the drive chain moves around the rotating tail shaft. Since the tail shaft is typically not driven, the guide sprocket does not exert rotational force on the drive chain but simply functions to maintain proper lateral alignment of the traveling grate along the tail shaft.

As the traveling grate drive chains become worn, the chain pitch length between adjacent links of the drive chain increases. Since the spacing between the teeth along the outer circumference of the drive sprocket remains constant, the chain wear causes the individual links of the drive chain to enter the guide sprocket late. As the wear and misalignment of the chain links along the guide sprocket continues to worsen, the chain links eventually contact the leading edge of the tooth surface. Further use of the guide sprocket and drive chain eventually causes both the drive chain and the guide sprocket to become worn and eventually may cause the drive chain to disengage from the guide sprocket.

Therefore, it is an object of the present invention to provide an improved guide sprocket assembly that can be attached to the tail shaft and can compensate for wear in the drive chain. It is a further object of the invention to provide a guide sprocket assembly having a lock plate assembly secured to the tail shaft and a guide sprocket that is freely rotatable relative to the lock plate assembly. It is a further object of the invention to provide a sprocket retainer between the guide sprocket and the lock plate assembly such that the sprocket retainer retains the guide sprocket in an annular sprocket groove formed in the lock plate assembly and allows the guide sprocket to freely rotate relative to the lock plate assembly.

SUMMARY OF THE INVENTION

The present invention is an improved guide sprocket assembly for use on the tail shaft of a traveling grate utilized in a combined pelletizing and direct reduction system. The guide sprocket assembly of the invention includes a lock plate assembly that is secured to the tail shaft for rotation along with the tail shaft. The lock plate assembly generally includes an annular sprocket groove formed along its outer circumference and positioned between a pair of spaced lock plates. Each of the lock plates include a chain support surface formed along its outer circumference. The chain support surface formed on each of the lock plates is generally flat and radially engages the drive chain passing around the guide sprocket assembly.

The annular sprocket groove formed between the lock plates is recessed from each of the chain support surfaces and is sized to receive a guide sprocket and a sprocket retainer. The sprocket retainer is positioned between the lock plate assembly and the guide sprocket to retain the guide sprocket within the annular sprocket groove. The guide sprocket is freely rotatable relative to the lock plate assembly and tail shaft, such that the guide sprocket can rotate in a direction opposite to a first direction of rotation of the lock plate assembly and the tail shaft. Thus, when the guide sprocket assembly is utilized with a worn drive chain, the increased spacing between links of the drive chain causes the guide sprocket to rotate opposite to the first direction of rotation of the tail shaft to properly align the guide sprocket with the chain links.

The radial distance between the longitudinal axis of rotation of the tail shaft and the chain support surfaces formed on the pair of lock plates is greater than the radial distance from the longitudinal rotational axis of the tail shaft to the outermost circumferential surface of the sprocket retainer. In this manner, when the guide sprocket assembly of the present invention engages the drive chain, the drive chain is supported solely on the chain support surfaces, thereby allowing the guide sprocket and sprocket retainer to rotate relative to the lock plate assembly. Each of the teeth on the guide sprocket includes a tapered trailing edge generally corresponding to the shape of each drive chain link. The leading edge of each tooth on the guide sprocket is generally flat, such that as the drive chain wears, the flat leading edge of each tooth causes the guide sprocket to rotate in the direction opposite the rotation of the tail shaft when the drive chain becomes worn.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
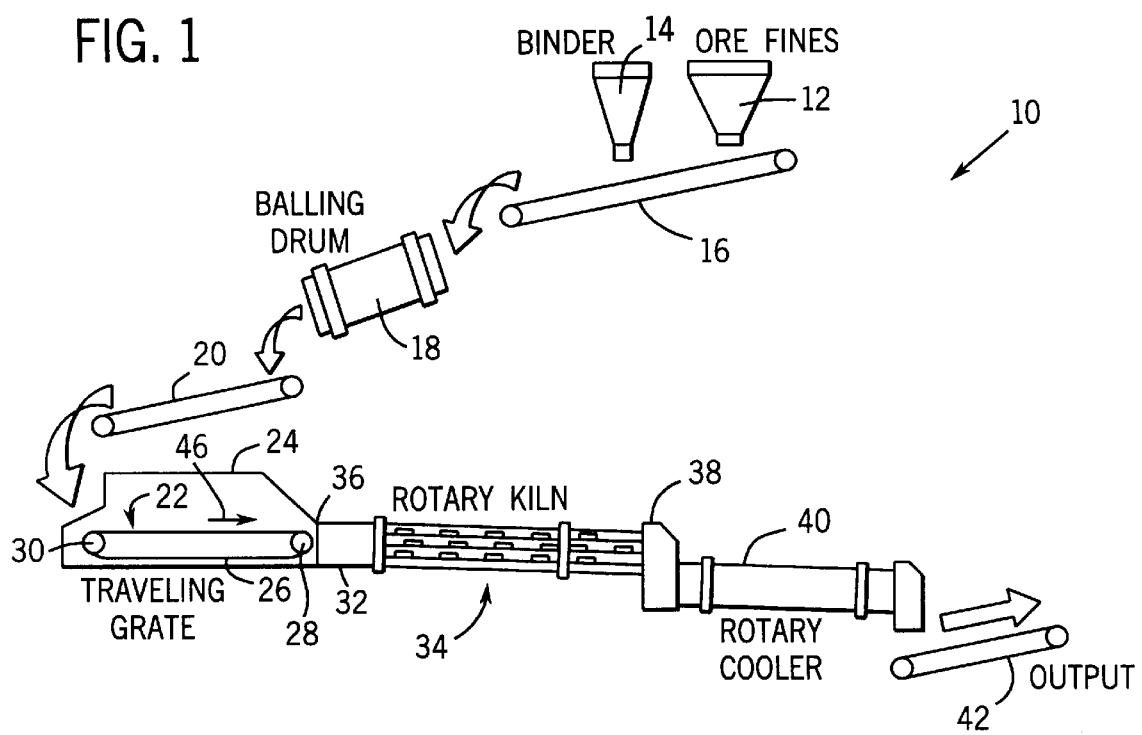
FIG. 1 is a schematic illustration of a combined pelletizing and direct reduction iron-ore processing system including an improved traveling grate incorporating features the present invention.

FIG. 1 illustrates a combined iron-ore pelletizing and direct reduction system 10 incorporating the features of the present invention. In the system 10, iron-ore fines 12 are combined with a binder 14 along a conveyor assembly 16. The combination of the binder 14 and ore fines 12 are fed into a balling drum 18 to form green balls, or pellets. After the pellets are formed in the balling drum 18, the pellets are properly sized in a roller classifier 20 with oversized pellets being fractured and returned to the feed bins.

The pellets of metal-bearing material are then deposited onto a traveling grate assembly 22 in a traveling grate section 24. The traveling grate section 24 is generally divided into drying and preheating sections or regions. Although not always required, the drying section may include an updraft drying portion where the gases flow upwardly therethrough and a downdraft drying portion where the gases flow downwardly therethrough. The preheat portion of the traveling grate section 24 is intended, after drying, to further elevate the temperature and improve the physical characteristic of the pellets of material therein to prevent shock and degradation during the remaining downstream processing.

The traveling grate assembly 22 generally includes a traveling grate 26 entrained between a downstream drive shaft 28 and an upstream tail shaft 30. The drive shaft 28 is rotatably driven to move the traveling grate 28 between the tail shaft 30 and the drive shaft 28. As discussed, while the pellets are within the traveling grate section 24, the pellets are both dried and preheated.

The traveling grate assembly 22 transfers the preheated pellets from the traveling grate section 24 to the first end 32 of a rotary kiln 34. While the pellets are in a chute area 36 between the traveling grate assembly 22 and the rotary kiln 34, fuel is mixed with the pellets to provide the primary source of the reducing agent for reducing the pellets or particles of material in the rotary kiln 34. Additionally, fuel in the form of gas or liquid may be added to the rotary kiln 34 through the ports in the lower region thereof for flow through the bed of pellets or particles in the rotary kiln 34.

In the rotary kiln 34, fuel and air are added to cause a reduction of the pellets as they slowly advance by rotation from the first end 32 to a second end 38 of the inclined rotary kiln 34. The hot pellets of reduced material are then transferred to a rotary cooler 40 to reduce the temperature of the pellets. The cooled pellets output from the rotary cooler 40 are fed to an outfeed conveyor 42 and advanced for proper screening, separation and collection of the desired finished product and various byproducts.

Figure 2:
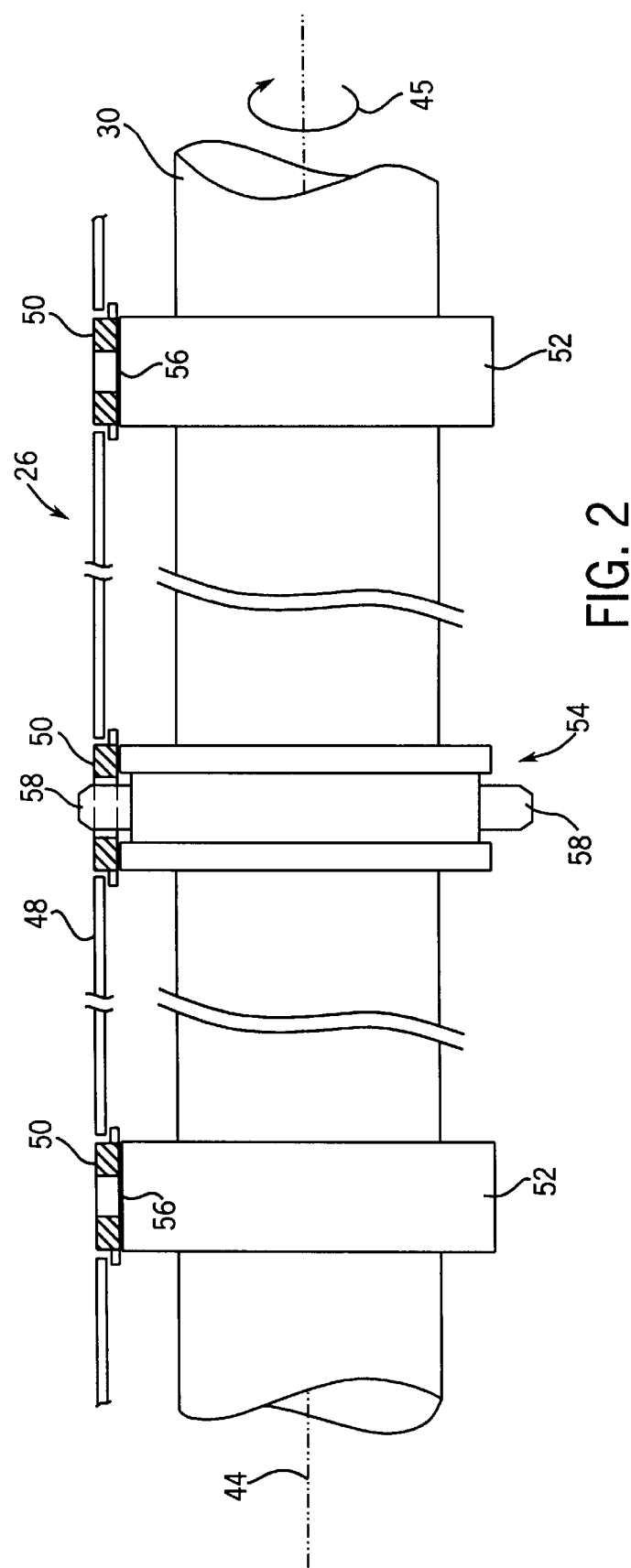
FIG. 2 is a partial front view of a tail shaft and guide sprocket assembly of the traveling grate that forms the present invention.

Referring now to FIG. 2, thereshown is the tail shaft 30 of the traveling grate assembly 22. The tail shaft 30 extends along a longitudinal axis 44 and is rotatable in a first direction shown by arrow 45 about the longitudinal axis 44. Although not shown, the tail shaft 30 is supported at each end by a bearing assembly such that the tail shaft 30 is freely rotatable about the longitudinal axis 44. In the preferred embodiment of the invention, the tail shaft 30 is non-driven and rotates in only the first direction such that the pellets of material move along with the traveling grate 26 in the direction indicated by arrow 46 in FIG. 1.

As can be seen in FIG. 2, the traveling grate 26 generally includes a plurality of individual slats 48 that are supported on each end by one of a plurality of drive chains 50. The individual slats 48 are each spaced from the adjacent slats by a gap sufficiently small to prevent pellets from falling between the individual slats as the pellets are moved through the traveling grate section 24 by the traveling grate 26. The slats 48 allow heated air to pass through the bed of pellets supported by the traveling grate 26 such that the pellets can be dried and preheated prior to their introduction into the rotary kiln 34.

A plurality of tail shaft rollers 52 and a single guide sprocket assembly 54 are positioned on the tail shaft 30 to support the spaced drive chains 50 of the traveling grate 26. The tail shaft rollers 52 and guide sprocket assembly 54 are spaced along the longitudinal length of the tail shaft 30 in a such a manner that each of the drive chains 50 are supported by either one of the tail shaft rollers 52 or the guide sprocket assembly 54. In the preferred embodiment of the invention, the tail shaft 30 includes five spaced tail shaft rollers 52 and a single guide sprocket assembly 54. Alternatively, depending on the width of the traveling grate 26 and the longitudinal length of the tail shaft 30, additional or fewer tail shaft rollers 52 could be used to support the traveling grate 26.

Since the tail shaft 30 is non-driven, the tail shaft rollers 52 and guide sprocket assembly 54 act simply to support the drive chains 50 of the traveling grate 26 and do not provide any motive force to move the traveling grate 26. Each of the tail shaft rollers 52 includes a generally smooth, outer circumferential support surface 56 that supports the drive chain 50 positioned thereupon. The tail shaft rollers 52 are each secured to the tail shaft 30 for rotation along with the tail shaft 30.

Figure 6:
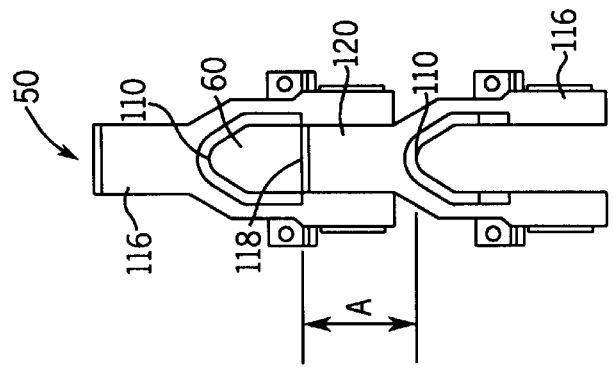
FIG. 6 is a top plan view of the drive chain that passes over the guide sprocket assembly of the present invention.

Although each of the tail shaft rollers 52 provides radial support for the respective drive chain 50, the smooth, outer circumferential support surface 56 does not prevent the traveling grate 26 from moving laterally along the longitudinal axis 44 of the tail shaft 30. For this reason, the guide sprocket assembly 54 is positioned on the tail shaft 30 and includes a plurality of teeth 58 that engage link openings 60 formed in the drive chain 50, as can be seen in FIG. 6. The interaction between the teeth 58 on the guide sprocket assembly 54 and the link openings 60 prevents the drive chain 50, and thus the traveling grate 26, from translating along the longitudinal axis 44 of the tail shaft 30.

Figure 3:
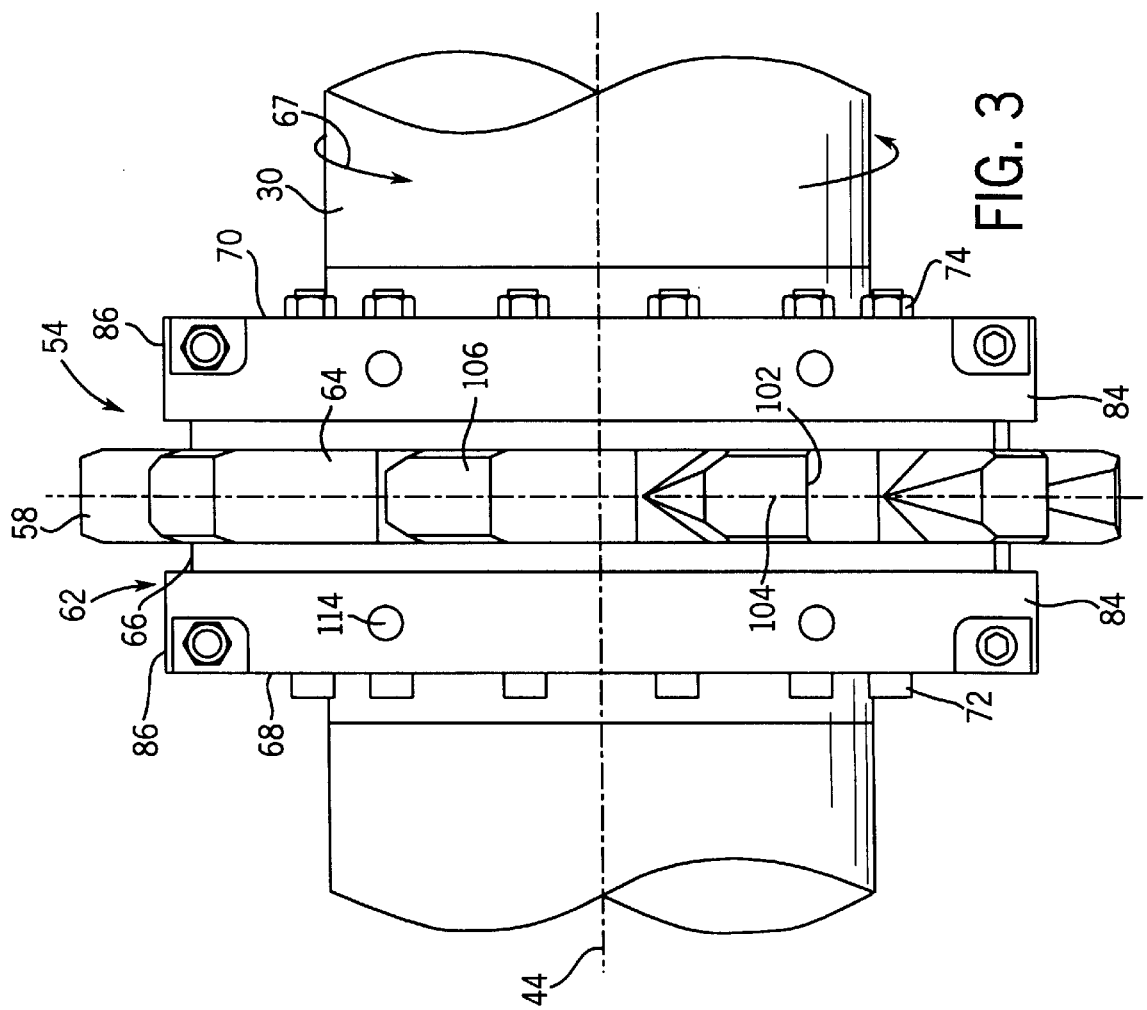
FIG. 3 is a detailed front view of the guide sprocket assembly of the present invention.
Figure 5:
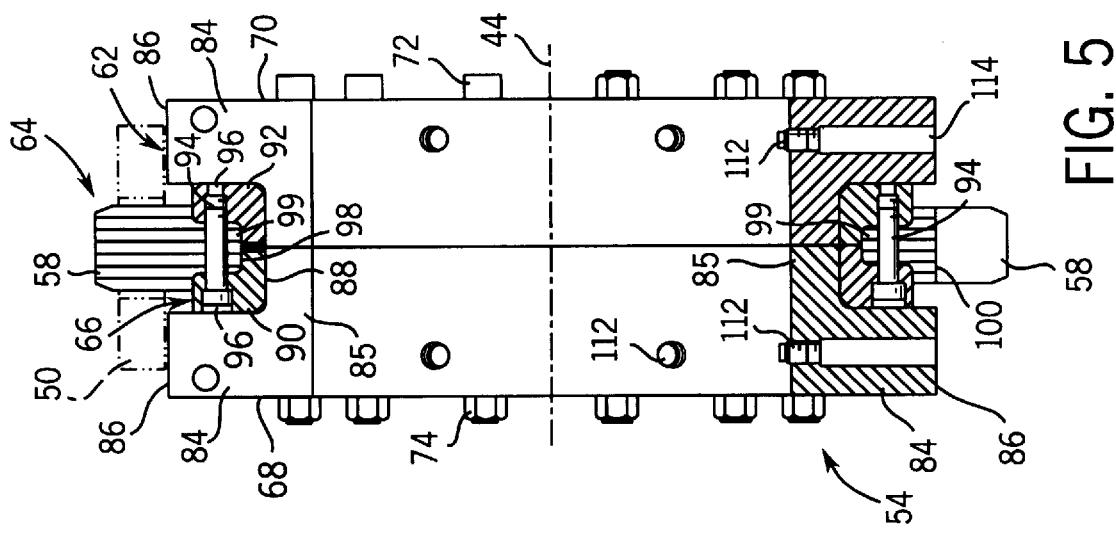
FIG. 5 is a partial section view taken along line 5—5 of FIG. 4.
Figure 4:
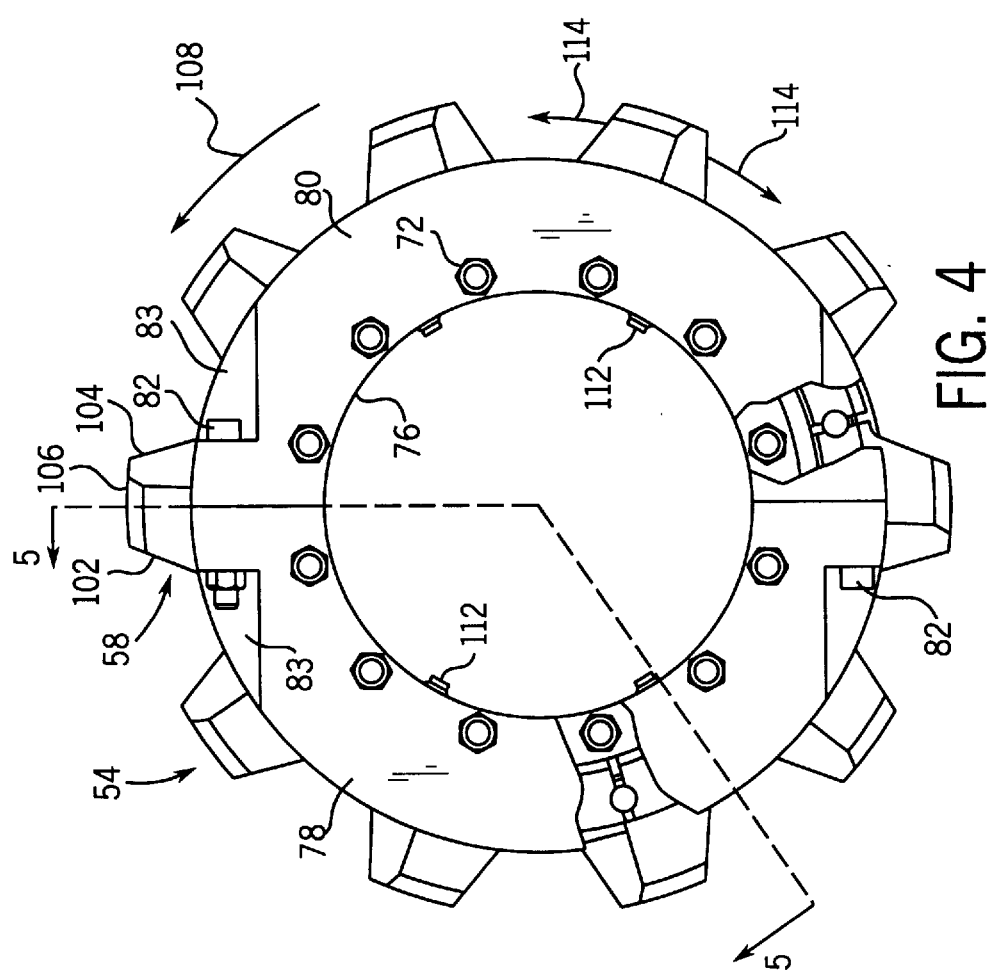
FIG. 4 is a side view of the guide sprocket assembly of the present invention.

Referring now to FIGS. 3–5, thereshown is the guide sprocket assembly 54 of the present invention. The guide sprocket assembly 54 generally includes a lock plate assembly 62, a guide sprocket 64 and a sprocket retainer 66. The lock plate assembly 62 is generally secured to the tail shaft 30 such that the lock plate assembly 62 rotates in the first direction, illustrated by arrow 67, along with the tail shaft 30.

The lock plate assembly 62 generally includes a pair of lock plates 68 and 70 that are positioned adjacent to each other along the longitudinal axis 44 of the tail shaft 30. The lock plates 68 and 70 are securely attached to each other by a plurality of socket head capscrews 72 and mating hex nuts 74 to define the lock plate assembly 62. The capscrews 72 pass through a plurality of aligned openings formed in each of the lock plates 68 and 70. The openings are spaced circumferentially along each of the lock plates 68, 70 and are positioned radially outward from an inner circumferential surface 76 contained on each of the lock plates 68, 70. The inner circumferential surface 76 has a diameter slightly larger than the diameter of the tail shaft 30 such that the inner circumferential surface 76 is in contact with the outer surface of the tail shaft 30.

As can be seen in FIG. 4, each of the lock plates 68 and 70 is formed from a pair of mating semicircular members 78 and 80 that are joined by a pair of socket head capscrews 82. The capscrews 82 are received in aligned openings formed in a recessed portion 83 of each semicircular member 78, 80. Thus, it can be appreciated that the lock plate assembly 62 is comprised of four individual components, including a pair of lock plates 68 and 70, each of which are formed from a pair of semicircular members 78 and 80.

As can best be seen in FIGS. 3 and 5, each of the lock plates 68 and 70 has a generally L-shaped profile including a radial projection 84 and a lateral projection 85. The radial projection 84 is defined at its outer circumference by a chain support surface 86. The chain support surface 86 is a generally smooth outer circumferential surface that defines the outermost diameter of the lock plate assembly 62. When the lock plate assembly 62 is assembled as shown in the Figures, the spacing between the pair of radial projections 84, created by the lateral projections 85, forms an annular sprocket groove 88 between the radial projections 84. As can best be seen in FIG. 5, the radial distance from the longitudinal axis of rotation 44 to the sprocket groove 88 is less than the radial distance between the chain support surface 86 and the axis of rotation 44.

Referring now to FIGS. 3 and 5, the guide sprocket 64 is positioned within the sprocket groove 88 and is retained therein by the sprocket retainer 66. The sprocket retainer 66 is an annular component including a first side member 90 and a second side member 92. The first and second side members 90 and 92 are each joined by a plurality of socket head capscrews 94 that are retained in aligned bores 96 formed in each of the first and second side members 90 and 92.

When the first side member 90 and second side member 92 of the sprocket retainer 66 are joined, the first side member 90 and the second side member 92 define an annular groove 98 that receives an attachment portion 99 extending radially inward from a generally smooth, curved outer surface 100 of the guide sprocket 64. Each of the socket head capscrews 94 pass through an opening formed in the attachment portion 99 of the guide sprocket 64, such that the guide sprocket 64 is securely retained within the annular groove 98 of the sprocket retainer 66.

The guide sprocket 64 includes a plurality of radially projecting teeth 58 positioned around its outer circumference. The teeth 58 extend from the curved surface 100 that defines the general outer circumference for the guide sprocket at the locations between the teeth 58. As can be seen in FIG. 5, the curved surface 100 is spaced radially inward from the pair of chain support surfaces 86, such that when the guide sprocket assembly 54 is in contact with one of the drive chains 50, the drive chain 50 is supported solely by the chain support surfaces 86, as shown in phantom in FIG. 5.

Referring back to FIG. 5, the axial width of the sprocket retainer 66 is slightly less than the width of the sprocket groove 88, such that the sprocket retainer 66 is freely movable within the sprocket groove 88. The combination of the sprocket retainer 66 and the guide sprocket 64 can freely rotate about the axis of rotation 44 in an opposite second direction relative to the rotation of lock plate assembly 62.

As can be seen in FIGS. 3 and 4, each tooth 58 on the guide sprocket 64 includes a leading edge 102, a trailing edge 104 and a top surface 106. The leading edge 102 and trailing edge 104 are defined relative to the direction of rotation of the lock plate assembly 62, as illustrated by arrow 108. The top surface 106 of each tooth 58 is sized such that the tooth 58 can be received in one of the link openings 60 in the drive chain 50, as illustrated in FIG. 6. The trailing edge 104 of each tooth 58 is tapered and contacts the trailing surface 110 of the link opening 60 as the drive chain 50 moves along the guide sprocket assembly 54.

The installation of the guide sprocket assembly 54 along the tail shaft 30, as well as the operation of the guide sprocket assembly 54, will now be described. Initially, the guide sprocket 64 is positioned around the tail shaft 30 and the first side member 90 and the second side member 92 of the sprocket retainer 66 are positioned such that the guide sprocket 64 is received within the annular groove 98 defined by the first side member 90 and second side member 92. After the side members 90, 92 and the guide sprocket 64 are properly positioned, the plurality of capscrews 94 are used to secure the attachment portion 99 of the guide sprocket 64 in the annular groove 98 of the sprocket retainer 66.

Once the combination of the sprocket retainer 66 and guide sprocket 64 are assembled surrounding the tail shaft 30, the lock plate 68 and the lock plate 70 are assembled on opposite sides of the previously assembled sprocket retainer 66. Specifically, each of the lock plates 68, 70 is assembled by joining the semicircular members 78, 80 of each lock plate by the capscrews 82. Once each of the lock plate 68, 70 has been assembled, the lock plates 68, 70 are moved toward their final position, such that the lateral projection 85 of each lock plate 68, 70 are positioned radially inward from the sprocket retainer 66 and the combination of the sprocket retainer 66 and guide sprocket 64 are received within the sprocket groove 88 formed by the combination of the lock members 68, 70. Once the lock plates 68, 70 are in the proper location, the plurality of capscrews 72 and hex nuts 74 are used to join the lock plates 68, 70 to form the lock plate assembly 62.

After the lock plate assembly 62 has been formed, attachment members 112 are positioned in a plurality of radial bores 114 formed in each of the radial projections 84 to secure the lock plate assembly 62 to the tail shaft 30. Thus, the lock plate assembly 62 will rotate in concert with the rotation of the tail shaft 30.

Once the guide sprocket assembly 54 has been secured along the tail shaft 30, the drive chain 50 can be positioned over the guide sprocket assembly 54. As shown in phantom in FIG. 5, the entire weight of the drive chain 50 is supported solely by the chain support surfaces 86 formed on each of the radial projections 84. Since the outermost portion of the sprocket retainer 66 is spaced radially inward from the chain support surfaces 86, the sprocket retainer 66 and the guide sprocket 64 are not subject to any radial force due to the guide chain 50. Thus, the combination of the sprocket retainer 66 and the guide sprocket 64 can freely rotate relative to the lock plate assembly 62, as illustrated by arrows 114 in FIG. 4.

Referring now to FIG. 6, as the drive chain 50 begins to wear, the distance between the trailing surface 110 of one chain link 116 and the leading surface 118 of the following chain link, as illustrated by distance A changes depending upon the drive chain wear. Since the pitch between individual teeth 54 on the guide sprocket 64 remains constant, as the drive chain 50 becomes worn, the teeth 54 do not smoothly enter into the link openings 60 and instead contact the bottom surface 120 of the drive chain. The contact between the teeth 54 and the bottom surface 120 of the drive chain 50 causes the guide sprocket 64 to rotate in the direction opposite to the rotational direction of the tail shaft 30 and lock plate assembly 62 such that the teeth 54 can enter into the link openings 60. In prior guide sprocket assemblies, the individual teeth were fixed because of the radial force on the guide sprocket, such that reverse rotation of the teeth was difficult. Instead, the individual teeth became worn and eventually the drive chain rode up on the teeth and could disengage the guide sprocket.

Although the tail shaft 30 and the guide sprocket assembly 54 of the present invention have been discussed as being incorporated in a system that both pelletizes and directly reduces iron-ore, it is contemplated by the inventor that the tail shaft and guide sprocket could be incorporated into any type of system in which a traveling grate is utilized. Additionally, although the tail shaft 30 has been disclosed as only including a single guide sprocket assembly, it is contemplated by the inventor that multiple assemblies could be incorporated while operating within the scope of the invention.

Various alternatives and embodiments are contemplated as being within the scope of the following claims particularly pointing out and distinctly claiming the subject matter regarded as the invention.

I claim:

1. A guide sprocket assembly for attachment to a tail shaft rotating in a first direction for guiding a drive chain around the tail shaft, the guide sprocket assembly comprising:
    an annular lock plate assembly securable to the rotating tail shaft for rotation with the tail shaft in the first direction, the lock plate assembly having an annular sprocket groove formed between a pair of annular, spaced lock plates, each lock plate having a circumferential chain support surface to radially support the drive chain; and
    an annular guide sprocket positioned within the annular sprocket groove, the annular guide sprocket being freely rotatable within the annular sprocket groove such that the annular guide sprocket is freely rotatable around to the lock plate assembly, the guide sprocket having a plurality of teeth spaced around its outer circumference for engaging the drive chain.

2. The guide sprocket assembly of claim 1 wherein each of the teeth on the guide sprocket includes a tapered trailing edge.

3. The guide sprocket assembly of claim 1 wherein the annular guide sprocket includes an outer circumferential surface, the plurality of teeth extending radially outward from the outer circumferential surface of the annular guide sprocket.

4. The guide sprocket assembly of claim 3 wherein the radius of the chain support surfaces from the axis of rotation of the tail shaft is greater than the radius of the outer circumferential surface of the annular guide sprocket from the axis of rotation of the tail shaft, such that when the drive chain is supported by the chain support surfaces, the drive chain is spaced radially outward from the outer circumferential surface of the annular guide sprocket.

5. A guide sprocket assembly for attachment to a tail shaft rotating in a first direction for guiding a drive chain around the tail shaft, the guide sprocket assembly comprising:
    an annular lock plate assembly securable to the rotating tail shaft for rotation with the tail shaft in the first direction, the lock plate assembly having an annular sprocket groove formed between a pair of annular, spaced lock plates;
    an annular guide sprocket positioned within the annular sprocket groove formed in the lock plate assembly, the guide sprocket being freely rotatable within the annular sprocket groove relative to the lock plate assembly, the guide sprocket having a plurality of teeth spaced around its outer circumference for engaging the drive chain; and
    a sprocket retainer positioned to retain the guide sprocket within the annular sprocket groove, the sprocket retainer and the guide sprocket being freely rotatable within the annular sprocket groove.

6. The guide sprocket assembly of claim 5 wherein the sprocket retainer includes an annular groove sized to receive an attachment portion of the guide sprocket, the attachment portion of the guide sprocket extending radially inward from an outer circumferential surface formed on the guide sprocket.

7. The guide sprocket assembly of claim 6 wherein the sprocket retainer includes a first side member and a second side member joined by a plurality of connectors, wherein each of the connectors pass through the attachment portion of the guide sprocket to retain the guide sprocket within the annular groove formed in the sprocket retainer.

8. The guide sprocket assembly of claim 5 wherein each of the lock plates includes a circumferential chain support surface, the chain support surfaces being positioned on opposite sides of the guide sprocket to radially support the drive chain on the guide sprocket assembly.

9. The guide sprocket assembly of claim 8 wherein the annular guide sprocket includes an outer circumferential surface, the plurality of teeth extending radially outward from the outer circumferential surface of the guide sprocket.

10. The guide sprocket assembly of claim 8 wherein the radius of the lock plates from the axis of rotation of the tail shaft to the chain support surface is greater than the radius of an outer surface of the sprocket retainer from the axis of rotation of the tail shaft, such that when the drive chain is supported by the chain support surfaces, the drive chain is radially spaced from the outer surface of the sprocket retainer.

11. The guide sprocket assembly of claim 5 wherein each of the teeth on the guide sprocket includes a tapered, trailing edge.

12. A tail shaft assembly for use in combination with a traveling grate having a plurality of drive chains spaced along the width of the traveling grate, the tail shaft assembly comprising:
    a tail shaft extending along the width of the traveling grate and rotatable about a longitudinal axis of rotation, the tail shaft being rotatable in a first direction;
    a plurality of rollers spaced along the longitudinal axis of the tail shaft and secured to the tail shaft for rotation therewith, each of the rollers contacting and supporting one of the drive chains; and
    a guide sprocket assembly positioned on the tail shaft and interposed amongst the rollers for guiding one of the drive chains, the guide sprocket assembly comprising:
        an annular lock plate assembly securable to the rotating tail shaft for rotation with the tail shaft in the first direction, the lock plate assembly having an annular sprocket groove formed between a pair of spaced lock plates; and
        an annular guide sprocket having a plurality of teeth spaced along its outer circumference for engaging the drive chain, the guide sprocket being positioned within the annular sprocket groove formed in the lock plate assembly and being freely rotatable relative to the lock plate assembly.

13. The tail shaft assembly of claim 12 wherein each of the teeth on the guide sprocket includes a tapered trailing edge.

14. The tail shaft assembly of claim 12 further comprising a sprocket retainer positioned between the lock plate assembly and the guide sprocket to retain the guide sprocket within the annular sprocket groove of the lock plate assembly, the sprocket retainer being freely rotatable within the annular sprocket groove.

15. The tail shaft assembly of claim 14 wherein the sprocket retainer includes an annular groove sized to receive an attachment portion of the guide sprocket, the attachment portion of the guide sprocket extending radially inward from an outer circumferential surface formed on the guide sprocket.

16. The tail shaft assembly of claim 15 wherein the sprocket retainer includes a first side member and a second side member joined by a plurality of connectors, wherein each of the connectors pass through the attachment portion of the guide sprocket to retain the guide sprocket within the annular groove formed in the sprocket retainer.

17. The tail shaft assembly of claim 14 wherein each of the lock plates includes a circumferential chain support surface, the chain support surfaces being positioned on opposite sides of the guide sprocket to support the drive chain on the guide sprocket assembly.

18. The tail shaft assembly of claim 17 wherein the radius of the lock plates from the axis of rotation of the tail shaft to the chain support surface is greater than the radius of the sprocket retainer from the axis of rotation of the tail shaft, such that when the drive chain is supported by the chain support surfaces, the drive chain is radially spaced from the sprocket retainer.

19. The tail shaft assembly of claim 12 wherein the tail shaft is non-driven.

* * * * *